(12) United States Patent
Kaufman

(10) Patent No.: US 9,739,667 B2
(45) Date of Patent: Aug. 22, 2017

(54) PASSIVE DETECTORS FOR IMAGING SYSTEMS

(71) Applicant: DIGITAL DIRECT IR, INC., Fresh Meadows, NY (US)

(72) Inventor: Peter N. Kaufman, Fresh Meadows, NY (US)

(73) Assignee: DIGITAL DIRECT IR, INC., Fresh Meadows, NY (US)

( * ) Notice: Subject to any disclaimer, the term of this patent is extended or adjusted under 35 U.S.C. 154(b) by 0 days.

(21) Appl. No.: 15/099,440

(22) Filed: Apr. 14, 2016

(65) Prior Publication Data

US 2017/0023414 A1    Jan. 26, 2017

Related U.S. Application Data

(63) Continuation-in-part of application No. 14/677,954, filed on Apr. 2, 2015, which is a continuation of application No. 13/588,441, filed on Aug. 17, 2012, now Pat. No. 9,012,845.

(60) Provisional application No. 61/524,669, filed on Aug. 17, 2011, provisional application No. 62/147,579, filed on Apr. 14, 2015.

(51) Int. Cl.
| | |
|---|---|
| G01J 5/40 | (2006.01) |
| G01J 5/20 | (2006.01) |
| G01J 5/34 | (2006.01) |
| G01J 5/06 | (2006.01) |
| G01J 5/04 | (2006.01) |
| G01J 1/44 | (2006.01) |
| G01J 5/02 | (2006.01) |
| G01J 5/10 | (2006.01) |
| G01J 5/44 | (2006.01) |
| G01J 5/08 | (2006.01) |
| G01J 5/00 | (2006.01) |

(52) U.S. Cl.
CPC . *G01J 5/40* (2013.01); *G01J 1/44* (2013.01); *G01J 5/023* (2013.01); *G01J 5/0225* (2013.01); *G01J 5/046* (2013.01); *G01J 5/06* (2013.01); *G01J 5/0806* (2013.01); *G01J 5/10* (2013.01); *G01J 5/20* (2013.01); *G01J 5/34* (2013.01); *G01J 5/44* (2013.01); *G01J 2005/0077* (2013.01); *G01J 2005/065* (2013.01)

(58) Field of Classification Search
None
See application file for complete search history.

(56) References Cited

U.S. PATENT DOCUMENTS

2007/0108383 A1*  5/2007  Combes ............... G01J 5/44
250/338.1

* cited by examiner

*Primary Examiner* — David Porta
*Assistant Examiner* — Gisselle Gutierrez

(57) ABSTRACT

Passive detector structures for imaging systems are provided, which are based on a coefficient of thermal expansion (CTE) framework. With such framework, a CTE-based passive detector structure includes a detector member that is configured to expand or contract in response to thermal heating resulting from photon exposure. The expanding/contracting CTE detector structure is configured to exert mechanical forces on resistor and/or capacitor circuit elements, which are part of an oscillator circuit, to vary the resistance and capacitance of such circuit elements and change a frequency or period of oscillation of an output signal of the oscillator circuit. The change in the frequency or period of oscillation of the output signal of the oscillator circuit is utilized to determine an amount of photon exposure of the CTE-based detector.

18 Claims, 10 Drawing Sheets

PASSIVE DETECTORS FOR IMAGING SYSTEMS

CROSS-REFERENCE TO RELATED APPLICATIONS

This application is a Continuation in Part of U.S. patent application Ser. No. 14/677,954, filed on Apr. 2, 2015, which is a Continuation of U.S. patent application Ser. No. 13/588,441, filed on Aug. 17, 2012, now U.S. Pat. No. 9,012,845, which claims priority to U.S. Provisional Patent Application Ser. No. 61/524,669, filed on Aug. 17, 2011, the disclosures of which are incorporated herein by reference. This application claims priority to U.S. Provisional Application Ser. No. 62/147,579, filed on Apr. 14, 2015, the disclosure of which is incorporated herein by reference.

TECHNICAL FIELD

The field generally relates to photon detector structures, photon detector arrays, and imaging systems and methods.

BACKGROUND

Conventional imager technologies use quantum and analog detectors, which are complicated to design, build and contain inherent fabrication and performance problems that are difficult and expensive to resolve. These detectors can only detect a small segment of the IR spectrum, either 4 µm or 10 µm (mid or far IR respectively), which is dependent on the detector material selected, the detector design and size. Some disadvantages and limitations of current IR technology are as follows.

The quantum semiconductor technologies have highly complex intricate structures. For example, each pixel has a multitude of nano-sized structures, which makes them difficult to fabricate, and expensive to produce. Moreover, multiple stages contribute noise which limits performance, and improving performance is complex and redesigns are expensive. The complexity requires high-end fabrication facilities and foundries. All these factors contribute to the high cost of such imagers. Furthermore, conventional imager designs are limited to one narrow segment of the IR spectrum, either 4µ or 10µ individually. The analog signals generated by conventional imager designs must be converted to a digital signal (via A/D conversion) before the signal is made into a video image. The instability and noise of analog systems is a significant problem and limits imager performance.

SUMMARY

Embodiments of the invention generally include imaging devices and methods, and in particular, passive detector structures which are based on a coefficient of thermal expansion (CTE) framework.

For example, one embodiment of the invention includes an imaging device. The imaging device includes a substrate, and a photon detector formed on the substrate. The photon detector comprises a circuit element, an unpowered detector member, and a thermal insulating member. The circuit element is connected to, and forms part of, an oscillator circuit, wherein the circuit element comprises an electrical property that determines a frequency or period of oscillation of an output signal generated by the oscillator circuit. The unpowered detector member is configured for photon exposure, wherein the unpowered detector member comprises a material having a thermal coefficient of expansion that causes the unpowered detector member to distort due to said photon exposure. The unpowered detector member is further configured to apply a mechanical force to the circuit element due to said distortion of the unpowered detector member, wherein the mechanical force causes a change in the electrical property of the circuit element, which changes the frequency or period of oscillation of the output signal generated by the oscillator circuit. The thermal insulating member is configured to thermally insulate the circuit element from the unpowered detector member. The imaging device further comprises digital circuitry configured to (i) determine the frequency or period of oscillation of the output signal generated by the oscillator circuit as a result of the mechanical force applied to the circuit element by the unpowered detector member, and to (ii) determine an amount of said photon exposure based on the determined frequency or period of oscillation of the output signal generated by the oscillator circuit.

In one embodiment, the electrical property comprises electrical resistance, and the circuit element comprises a resistor structure. In another embodiment, the electrical property comprises capacitance, and the circuit element comprises a capacitor structure.

Another embodiment of the invention includes a method for detecting photonic energy, wherein the method comprises:

exposing a photon detector to incident photons, wherein the photon detector comprises an unpowered detector member, a circuit element that is connected to, and forms part of, an oscillator circuit, and a thermal insulating member configured to thermally insulate the circuit element from the unpowered detector member, wherein the circuit element comprises an electrical property that determines a frequency or period of oscillation of an output signal generated by the oscillator circuit;

distorting the unpowered detector member due to said photon exposure, wherein the unpowered detector member comprises a material having a thermal coefficient of expansion that causes the unpowered detector member to distort due to said photon exposure;

applying a mechanical force to the circuit element due to the distorting of the unpowered detector member, wherein the mechanical force causes a change in the electrical property of the circuit element, which changes the frequency or period of oscillation of the output signal generated by the oscillator circuit;

determining a frequency or period of oscillation of the output signal generated by the oscillator circuit as a result of the mechanical force applied to the circuit element by the unpowered detector member; and determining an amount of said photon exposure of said photon detector based on said determined frequency or period of oscillation of the output signal generated by the oscillator circuit.

Other embodiments of the invention will be described in following detailed description of illustrative embodiments thereof, which is to be read in conjunction with the accompanying drawings.

DETAILED DESCRIPTION OF EMBODIMENTS

Figure 1A:
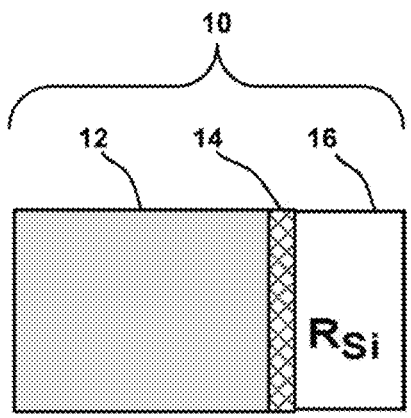
FIG. 1A is a conceptual schematic view of a photon detector device according to an embodiment of the invention, which is based on a coefficient of thermal expansion (CTE) framework.

Embodiments of the invention will now be described in further detail below with regard passive detector structures for imaging systems, which are based on a coefficient of thermal expansion (CTE) framework. With such framework, a CTE-based passive detector structure comprises a detector member that is configured to expand or contract in response to thermal heating resulting from photon exposure. In accordance with embodiments of the invention, the expanding/contracting CTE detector structures are configured to exert mechanical forces on resistor and/or capacitor circuit elements, which are part of an oscillator circuit, to vary the resistance and capacitance of such circuit elements and change a frequency or period of oscillation of an output signal of the oscillator circuit. The change in the frequency or period of oscillation of the output signal of the oscillator circuit is utilized to determine the amount of photon exposure of the CTE-based detector.

Exemplary embodiments of CTE-based passive detector structures as described herein are extensions of the CTE-based passive detector frameworks disclosed in U.S. Pat. No. 9,012,845 (and its Continuation U.S. patent application Ser. No. 14/677,954). These patents describe a new paradigm for detecting incident IR enemy using passive detector structures which provide direct-to-digital measurement data output for detecting incident IR radiation with no analog front end (no A/D conversion) or quantum semiconductors, thereby providing a low noise, low power, low cost and ease of manufacture detector design, as compared to conventional CMOS or CCD detector devices. Passive detector frameworks with direct-to-digital measurement data output as described herein do not use quantum photonic or electron conversion techniques, and have none of the technological, manufacturing or noise problems associated with conventional imager technologies.

For example, a thermal infrared detector framework as described in U.S. Pat. No. 9,012,845 comprises a piezoelectric resonator member (e.g., PZT) formed of a piezoelectric material that is configured to resonate in response to a drive voltage and generate an output signal having a frequency or period of oscillation. The thermal IR detector further comprises an electrically unpowered detector member (IR-Absorber), wherein the electrically unpowered detector member is configured for exposure to incident thermal infrared radiation. The electrically unpowered detector member comprises a material having a thermal coefficient of expansion (CTE) which causes the electrically unpowered detector member to distort due to absorption of incident thermal infrared radiation. The electrically unpowered detector member applies a mechanical force to the piezoelectric resonator member due to the distortion of the electrically unpowered detector member, which causes a change in a frequency or period of oscillation of the output signal generated by the piezoelectric resonator member due to the mechanical force applied to the piezoelectric resonator member. The thermal infrared detector further includes a thermal insulating member configured to thermally insulate the piezoelectric resonator member from the electrically unpowered detector member.

It is to be understood that the various layers, structures, and regions shown in the accompanying drawings are schematic illustrations that are not drawn to scale. In addition, for ease of explanation, one or more layers, structures, and regions of a type commonly used to form imaging devices or structures may not be explicitly shown in a given drawing. This does not imply that any layers, structures, and regions not explicitly shown are omitted from the actual imaging devices and structures. Furthermore, it is to be understood that the embodiments discussed herein are not limited to the particular materials, features, and/or processing steps as described herein.

Moreover, the same or similar reference numbers are used throughout the drawings to denote the same or similar features, elements, or structures, and thus, a detailed explanation of the same or similar features, elements, or structures will not be repeated for each of the drawings. It is to be understood that the term "about" as used herein with regard to thicknesses, widths, percentages, ranges, etc., is meant to denote being close or approximate to, but not exactly. For example, the term "about" as used herein implies that a small margin of error is present, such as 1% or less than the stated amount.

FIG. 1A is a schematic view of a photon detector device according to an exemplary embodiment of the invention, which is based on a CTE framework. More specifically, FIG. 1A is a conceptual schematic view of a CTE-based photon detector 10 comprising an unpowered detector member 12, an insulating member 14, and a resistor element 16. The unpowered detector member 12 is configured for photon exposure, wherein the unpowered detector member 12 comprises a material having a thermal coefficient of expansion that causes the unpowered detector member 12 to distort (e.g., expand) due to absorption of incident photons, e.g., absorption of incident thermal IR photonic radiation. The unpowered detector member 12 is configured to apply a mechanical force to the resistor element 16 (through the insulating layer 14) as a result of the distortion (e.g. expansion) of the unpowered detector member 12. The mechanical force causes stress on the resistor element 16 which, in turn, causes a change in resistance (e.g., increases in resistance) of the resistor element 16.

Figure 1B:
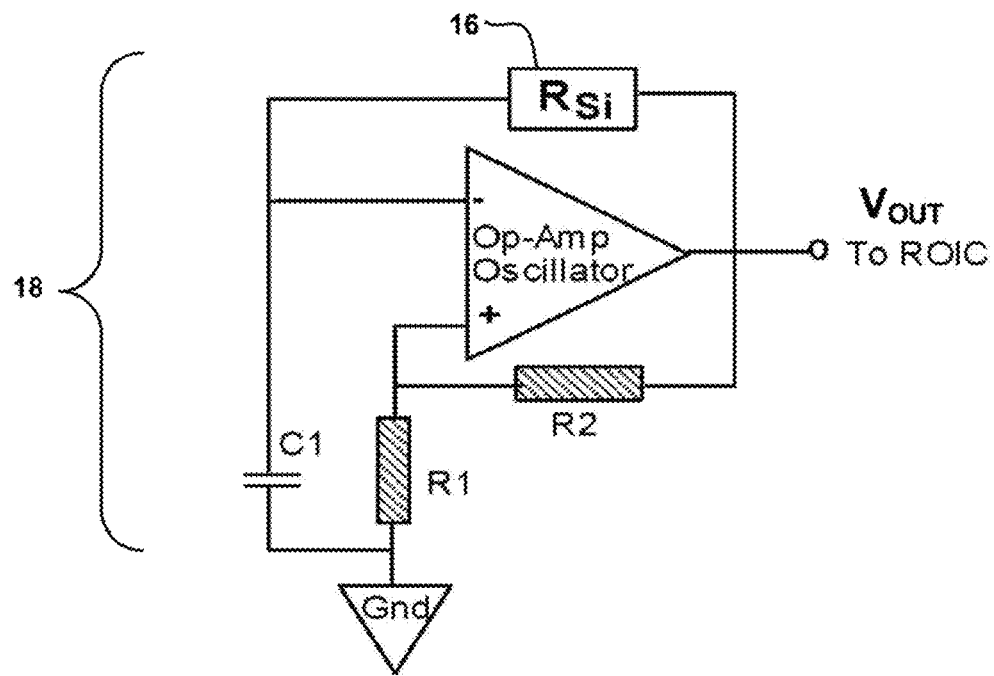
FIG. 1B is a schematic diagram of an oscillator circuit having a variable resistor element, which can be implemented with a CTE photon detector according to an embodiment of the invention.

FIG. 1B shows an embodiment of an oscillator circuit 18 which comprises the resistor element 16 connected in a feedback loop of an operational amplifier circuit. The resistor element 16 serves as a variable resistor in the oscillator circuit 18, wherein the resistance value varies depending on the amount of Stress force applied to the resistor element 16 by the expansion/contraction of the unpowered detector member 12. In one embodiment of the invention, the oscillator circuit 18 can be configured to generate a square wave output signal $V_{OUT}$, wherein a frequency Or period of oscillation of the output signal $V_{OUT}$ generated by the oscillator circuit 18 will vary depending on the resistance of the resistor element 16.

Figure 1C:
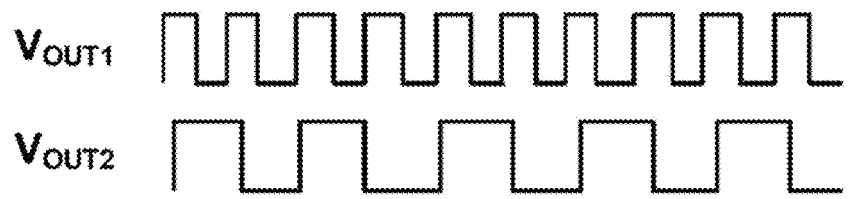
FIG. 1C depicts illustrative waveforms of output signals $V_{OUT}$ having different frequencies, which can be generated by the oscillator circuit of FIG. 1B in response to changes in resistance of the variable resistor element.

For example, FIG. 1C depicts illustrative waveforms of output signals $V_{OUT}$ having different frequencies, which can be generated by the oscillator circuit 18 in response to changes in resistance of the resistor element 16. In one example embodiment, FIG. 1C illustrates a first output signal $V_{OUT1}$ having a first frequency or period of oscillation, and a second output signal $V_{OUT2}$ having a second frequency or period of oscillation, which is less than the first frequency or period of oscillation of $V_{OUT1}$. The first output signal $V_{OUT1}$ may be output from the oscillator circuit 18 when no mechanical stress is applied to the resistor element 16 by the unpowered detector member 12 (e.g., quiescent state). As the unpowered detector member 12 heats up from absorption of incident photonic radiation, and applies mechanical stress to the resistor element 16 due to expansion of the unpowered detector member 12, the resistance of the resistor element 16 increases, causing the oscillator circuit 18 to output the second output signal $V_{OUT2}$, i.e., the frequency of the output signal $V_{OUT}$ generated by the oscillator circuit 18 decreases as the resistance of the resistor element 16 increases.

In this example embodiment, the frequency of the oscillator circuit 18 changes in proportion to an amount of exposure of incident IR photonic radiation, which can be determined by an ROIC (read out integrated circuit) connected to an output of the oscillator circuit 18. In one embodiment of the invention, the ROIC comprises digital circuitry configured to (i) determine the frequency or period of oscillation of the output signal $V_{OUT}$ generated by the oscillator circuit 18 at a given time, which varies as a result of a change in the resistance of the resistor element 16 as mechanical stress is applied to the resistor element 16 by the unpowered detector member 12, and to (ii) determine an amount of photon exposure based on the determined frequency or period of oscillation of the output signal $V_{OUT}$ at the given time. In one embodiment, calibration methods can be implemented to determine or otherwise correlate a given output frequency $V_{OUT}$ with an amount of photon exposure. An exemplary embodiment of digital circuitry which is configured to determine the frequency or period of oscillation of the output signal $V_{OUT}$ generated by the oscillator circuit 18 and to determine an amount of photon exposure based on the determined frequency or period of oscillation of the output signal $V_{OUT}$, will be described in further detail below with reference to FIGS. 9 and 10, for example.

In one embodiment of the invention, the unpowered detector member 12 is formed a material (or multiple materials) which can absorb photons (e.g. thermal IR radiation) and which have a suitable thermal coefficient of expansion characteristic. For example, in one embodiment of the invention, the unpowered detector member 12 is formed of copper, or other similar materials.

The insulating member 14 is formed of any suitable material that can electrically and thermally insulate the resistor element 16 from the unpowered detector member 12. For example, in one embodiment, the insulating member 14 can be formed of graphite or other similar materials. In another embodiment, the insulating member 14 can be formed of a silicon oxide or other similar materials.

The resistor element 16 is formed of any material that can be utilized as a resistor circuit element of an oscillator circuit, and which has an electrical resistance that varies in response to stress forces applied to the resistor element 16. For example, in one embodiment of the invention, the resistor element 16 can be formed of silicon (Si). In another embodiment, the resistor element 16 can be formed of graphene.

The oscillator circuit 18 shown in FIG. 1B is just an example of an operational amplifier-based oscillator circuit that can be implemented. In other embodiments of the invention, any type of RC oscillator circuit can be implemented, with or without operational amplifiers, wherein the resistor element 16 is utilized as a resistor in the RC oscillator circuit whose resistance value can be varied to change the output frequency of the RC oscillator circuit.

Figure 2:
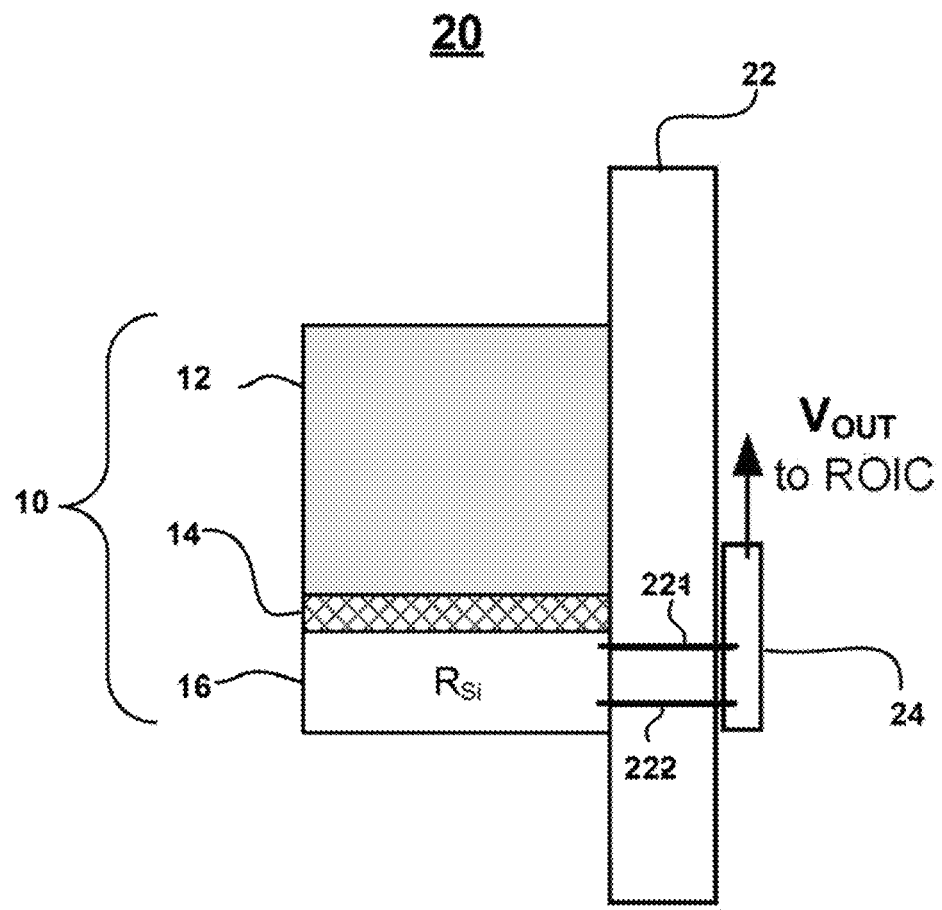
FIG. 2 is a conceptual schematic view of an imaging device according to an embodiment of the invention, which is based on a CTE photon detector framework.

FIG. 2 is a schematic view of an imaging device according to an embodiment of the invention, which incorporates one or more CTE-based photon detectors and associated oscillator circuits. In particular, FIG. 2 illustrates an imaging device 20 comprising one or more of the CTE-based photon detector 10 (FIG. 1A) formed on one side of a substrate 22. A corresponding oscillator circuit 24 is formed on an opposite side of the substrate 22. A plurality of through silicon vias (TSVs) 22-1 and 22-2 are formed through the substrate 22 to connect the resistor element 16 to the oscillator circuitry 24. Although one photon detector 10 and associated oscillator circuitry 24 are shown in FIG. 2, the imaging device 20 may include a plurality of photon detectors and associated oscillator circuits, e.g., forming a focal plane array of thermal IR detectors.

In one embodiment of the invention, the oscillator 24 can implemented using the oscillator circuit 18 of FIG. 1B, or any other suitable RC oscillator circuitry. In one embodiment of the invention, the oscillator circuitry 24 and ROIC circuitry can be integrally formed as part of active components on the surface of the substrate 22. In another embodiment of the invention, the oscillator circuitry 24 and/or ROIC circuitry can be fabricated on a separate substrate, which is then bonded to the substrate 22 using, e.g., an array of micro solder ball connections (e.g., C4 connections).

Figure 3A:
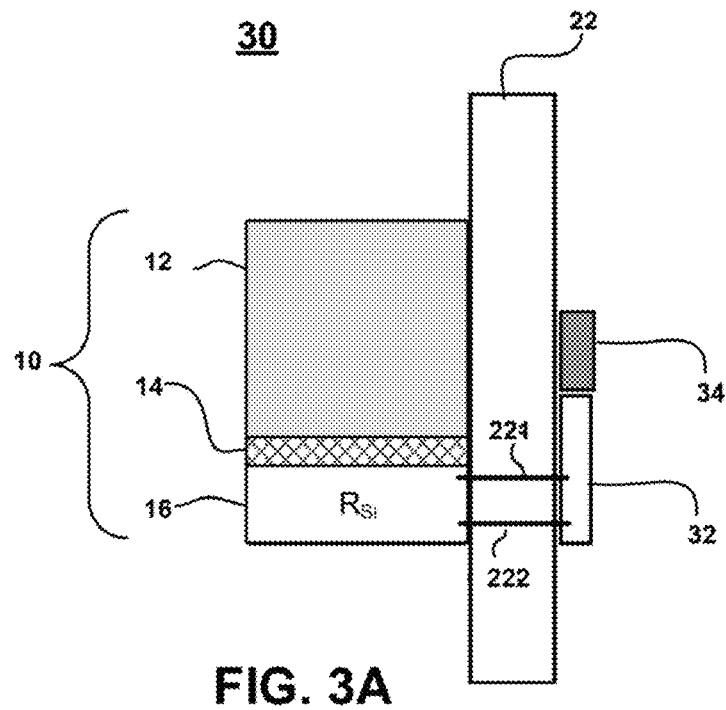
FIG. 3A schematically illustrates a imaging device according to another embodiment of the invention having a LED display output, which is based on a CTE photon detector framework.

FIG. 3A is a schematic view of an imaging device according to another embodiment of the invention. In particular, FIG. 3A illustrates an imaging device 30 comprising a direct drive LED display output. As with the imaging device 20 of FIG. 2, the imaging device 30 of FIG. 3A comprises one or more of the GTE-based photon detector 10 (FIG. 1A) formed on one side of the substrate 22. A corresponding LED driving circuit 32 and LED 34 are formed on an opposite side of the substrate 22. A plurality of through silicon vias 22-1 and 22-2 are formed through the substrate 22 to connect the resistor element 16 to the LED driver circuitry 32.

Figure 3B:
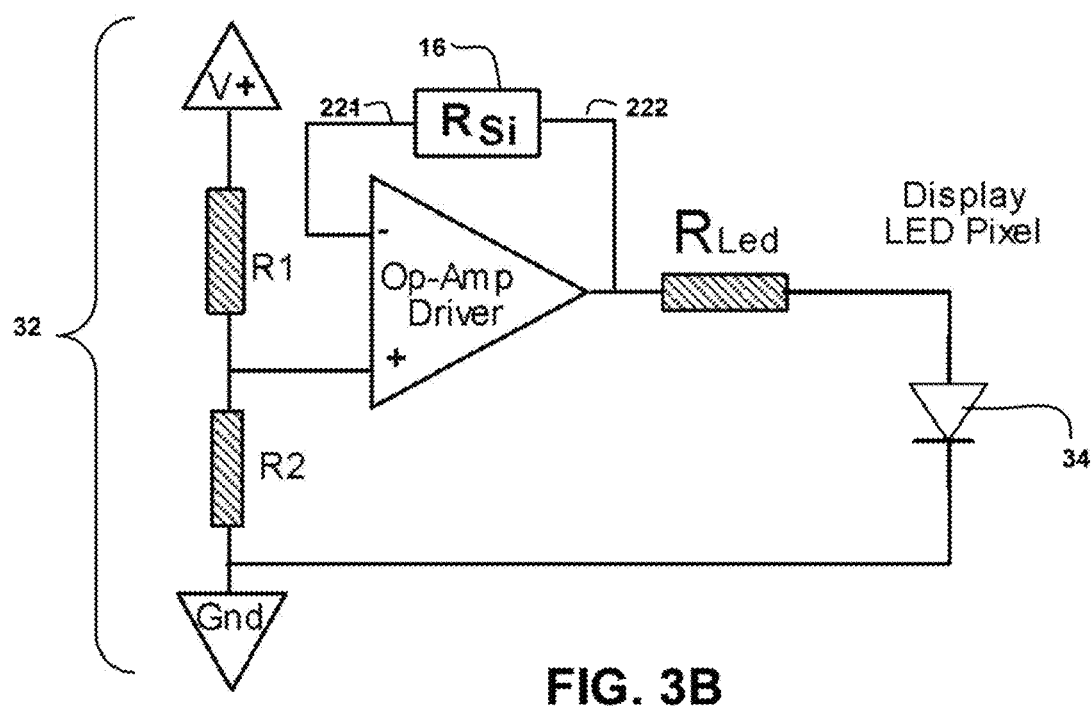
FIG. 3B is a schematic diagram of an LED driver circuit having a variable resistor element, which can be implemented in the imaging device of FIG. 3A to drive an LED, according to an embodiment of the invention.

FIG. 3B illustrates an embodiment of the LED driver circuit 32, which can be implemented to drive the LED 34 to provide a direct drive LED display output. In this embodiment, the resistor element 16 is utilized as a variable resistor a feedback loop of an operational amplifier driver circuit 32. As stress force is applied to the resistor element 16 (by expansion of the unpowered detector member 12), the resistance of the resistor element 16 changes, which in turn changes the drive current that is generated by the driver circuit 32 and applied to the LED 34. In effect, the brightness of the LED 34 will vary depending on the amount of drive current supplied to the LED 34 by the LED driver circuit 32, which in turn depends on the resistance of the resistor element 12, which in turn depends on the amount of stress force applied to the resistor element 16 by the detector member 12, which in turn depends on the amount of incident photonic radiation absorbed by the detector member 12.

Although one photon detector 10 and associated LED driver circuit 32 and LED 34 are shown in FIG. 3B, the imaging device 30 may include a plurality of photon detectors and associated LED driver circuits and LED devices to provide, e.g., a focal plane array of thermal IR detectors and a corresponding LED pixel display.

In one embodiment of the invention, the LED driver 32 can implemented using the circuit of FIG. 3B, or any other suitable LED driver circuitry. For example, in one embodiment of the invention, the LED driver circuitry 32 in FIG. 3B can be implemented using an oscillator circuit such as shown in FIG. 1B. In this embodiment, the LED 34 can be driven with a square wave signal, wherein brightness of the LED varies depends on the frequency of the square wave signal, as is understood by one of ordinary skill in the art.

In one embodiment of the invention, the LED driver circuitry 32 and LED 34 can be integrally formed as part of active components on the surface of the substrate 22. In another embodiment of the invention, the LED driver circuitry 32 and LED 34 can be fabricated on another substrate, which is then bonded to the substrate 22 using, e.g., an array of micro solder ball connections (e.g., C4 connections).

It is to be understood that the photon detector structure 10 shown in FIGS. 1A, 2, and 3A is a conceptual structure that is presented to describe a basic fundamental inventive concept of using a CTE-based detector framework to apply stress to a circuit element (e.g., resistor or capacitor) that is connected to, and forms part of, an oscillator circuit, for example, wherein the circuit element comprises an electrical property that determines a frequency or period of oscillation of an output signal generated by the oscillator circuit. The conceptual photon detector structure 10 can be structurally implemented in numerous ways using, e.g., example embodiments as described in further detail below.

Figures 4A, 4B:
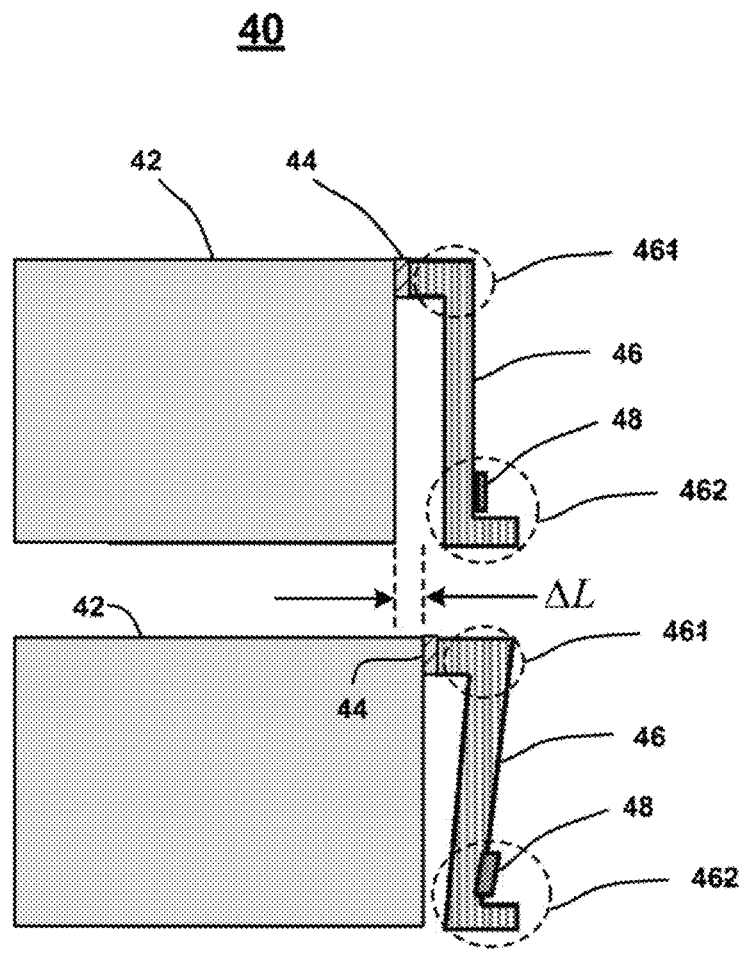
FIGS. 4A and 4B are conceptual schematic views of a photon detector device according to another embodiment of the invention, which is based on a CTE framework.

FIG. 4A schematically illustrates a photon detector device according to another exemplary embodiment of the invention, which is based on a CTE framework. More specifically, FIG. 4A is a conceptual schematic view of a CTE-based photon detector 40 comprising an unpowered detector member 42, an insulating member 44, a flexible lever member 46, and a resistor element 48. In one embodiment of the invention, the flexible lever member 46 is formed of a flexible metallic material such as gold, aluminum, etc. Other materials can be used to fabricate the flexible lever member 46, which are suitable for the given application.

The flexible lever member 46 comprises a first end portion 46-1 and a second end portion 46-2. The insulating member 44 is formed on the first end portion 46-1 to thermally insulate the flexible lever member 46 from the detector member 42. The second end portion 46-2 is elbow-shaped, and held in a fixed position. The resistor element 48 is fixedly disposed on an inside surface of the elbow-shaped end portion 46-2. Although not specifically shown, a thin layer of insulating material is disposed between the resistor element 48 and the flexible lever member 46 to thermally and electrically insulate the resistor element 48 from the flexible lever member 46.

The unpowered detector member 42 comprises a material having a thermal coefficient of expansion that causes the unpowered detector member 42 to distort (e.g., expand) due to absorption of incident photons, e.g., absorption of incident thermal IR photonic radiation. In operation, when the unpowered detector member 42 expands due to absorption of thermal IR photons, the detector member 42 applies a mechanical force to the first end portion 46-1 of the flexible lever member 46. Since the first end portion 46-1 is not secured in a fixed position, and since the second end portion 46-2 is secured in a fixed position, the mechanical force applied to the first end portion 46-1 by the expanding detector member 42 causes the flexible lever member 46 to bend at the elbow-shaped second end portion 46-2, such as schematically illustrated in FIG. 4B.

In particular, FIG. 4B schematically illustrates a state of operation of the photon detector 40 of FIG. 4A, in which the unpowered detector member 42 has expanded to an increased length (e.g., length increase of ΔL), causing the flexible lever member 46 to bend at the elbow-shaped second end portion 46-2. This bending of the second end portion 46-2 applies stress to the resistor element 48, which in turn causes a change in resistance (e.g., increases in resistance) of the resistor element 48. Using techniques as discussed above, the resistor element 48 can be a variable resistor element that is part of an RC oscillator circuit, wherein the change in resistance of the resistor element 48 can be used to vary a current or voltage of the oscillator circuit or an LED driver circuit, for example.

Figure 5A:
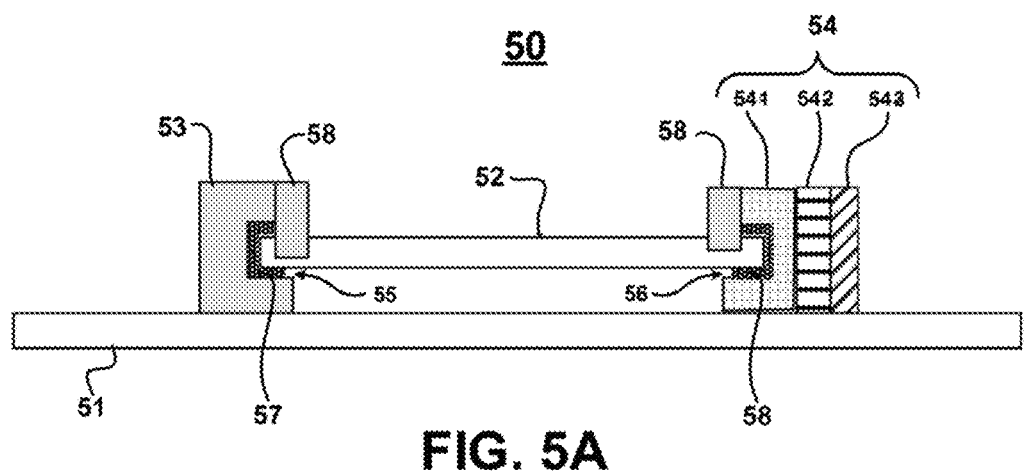
FIGS. 5A and 5B are schematic views of a photon detector device according to another embodiment of the invention, which is based on a CTE framework.
Figure 5B:
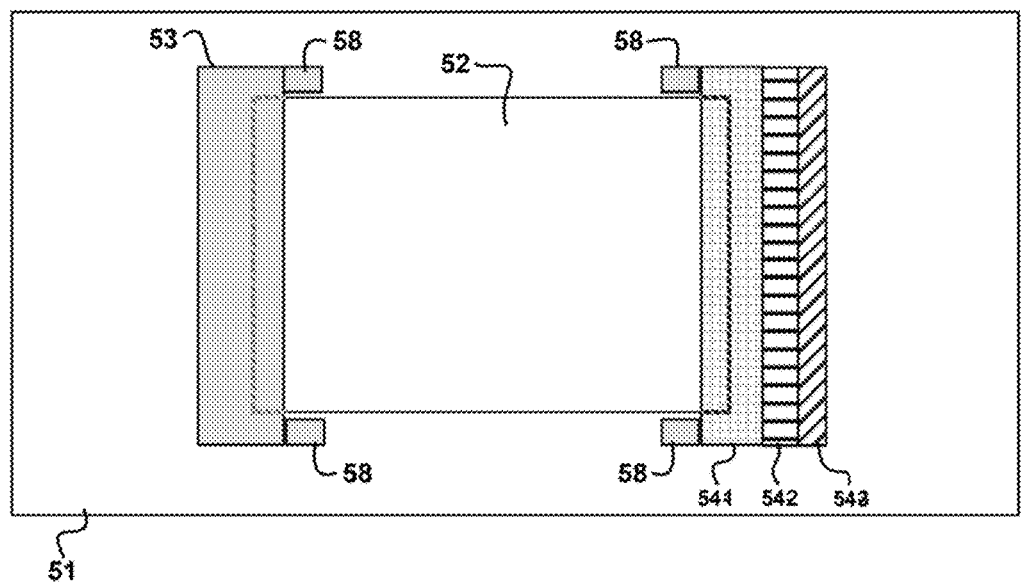

FIGS. 5A and 5B schematically illustrate a photon detector device 50 according to another embodiment of the invention, which is based on a CTE framework. In general, FIGS. 5A and 5B illustrate a photon detector structure that is configured to exert mechanical force on a capacitor structure, which is implemented as a variable capacitor in an oscillator circuit, to vary the capacitance of the capacitor structure and change a frequency or period of oscillation of an output signal of the oscillator circuit. As with the resistor-based CTE frameworks discussed above, a change in the frequency or period of oscillation of the output signal of the oscillator circuit (due to a change in capacitance of the stressed capacitor) is indicative of the amount of photon exposure of a CTE-based detector.

More specifically, FIG. 5A is a schematic side view of the photon detector device 50, and FIG. 5B is a top view of the photon detector device 50. As shown in FIGS. 5A and 5B, the photon detector device 50 comprises a substrate 51, an unpowered detector member 52 (or plate-shaped detector member) a first support member 53, and a second support member 54. In this embodiment, the second support member 54 comprises a capacitor structure comprising a first conductive plate 54-1 (e.g., anode), a dielectric member 54-2, and a second conductive plate 54-3 (e.g., cathode).

The first support member 53 comprises a slot 55, and the second support member 54 comprises a slot 56. In particular, the slot 56 is formed in the first conductive plate 54-1 of the capacitor structure 54. The unpowered detector member 52 is a plate-shaped structure having one end inserted in the slot 55 of the first support member 53, and another end inserted in the slot 56 of the second support member 54. The first and second support members 53 and 54 maintain the plate-shaped detector member 52 at some offset height from the surface of the substrate 51. Moreover, the inner surfaces of the slots 55 and 56 are lined with respective insulating materials 57 and 58, which are configured to thermally and electrically insulate the plate-shaped detector member 52 from the first and second support members 53 and 54. In this configuration, the plate-shaped detector member 52 is thermally insulated from the substrate 51 and other structures and components of the photon detector 50. The end portions of the plate-shaped detector member 52 are maintained within the slots 55 and 56 using retaining members 58 that are disposed at the sides of the first and second support members 53 and 54.

The plate-shaped detector member 52 comprises a material having a thermal coefficient of expansion that causes the detector member 52 to distort (e.g., expand) due to absorption of incident photons, e.g., absorption of incident thermal IR photonic radiation. Moreover, the second support member 54 is configured as a variable capacitor structure by constructing the dielectric member 54-2 with a material that causes a change in the capacitance of the capacitor structure 54 when stress forces are applied to the dielectric member 54-2 due to the expansion and contraction of the plate-shaped detector member 52.

In one embodiment of the invention, the dielectric member 54-2 can be formed from tantalum, or a tantalum alloy, for example. Other dielectric materials having similar properties can be implemented.

In operation, when the plate-shape detector member 52 expands due absorption of thermal IR radiation, the expanding detector 52 exerts mechanical stress on the capacitor structure 54, in particular, squeezing the dielectric member 54-2 between the first and second conductive plates 54-1 and 54-3, which results in changing the capacitance of the capacitor structure 54. Using techniques as discussed above, the capacitor structure 54 can be a capacitor element that is part of an RC oscillator circuit, wherein the change in capacitance of the capacitor structure 54 can be used to vary a current or voltage of the oscillator circuit or an LED driver circuit, for example. For example, the capacitor structure 54 of FIGS. 5A and 5B can be utilized as the capacitor C1 in the oscillator circuit 18 of FIG. 1B, wherein the oscillator 18 is formed in an active device layer of the substrate 51 with interconnects connecting the first and second conductive plates 54-1 an 54-3 to the active oscillatory formed in the substrate 51.

Figure 6A:
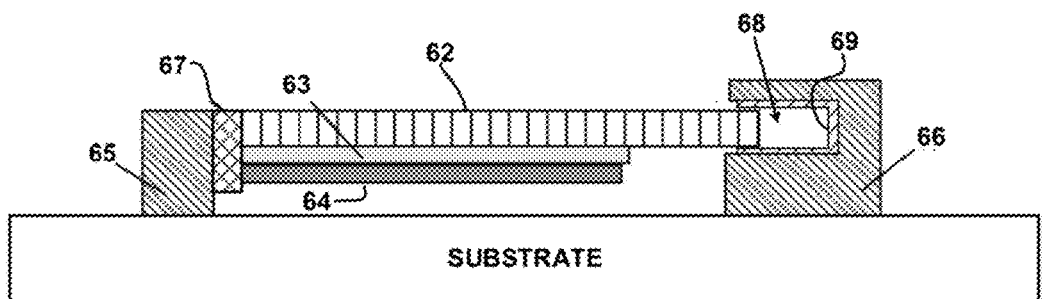
FIGS. 6A, 6B, and 6C are schematic views of a photon detector device according to another embodiment of the invention, which is based on a CTE framework.
Figure 6B:
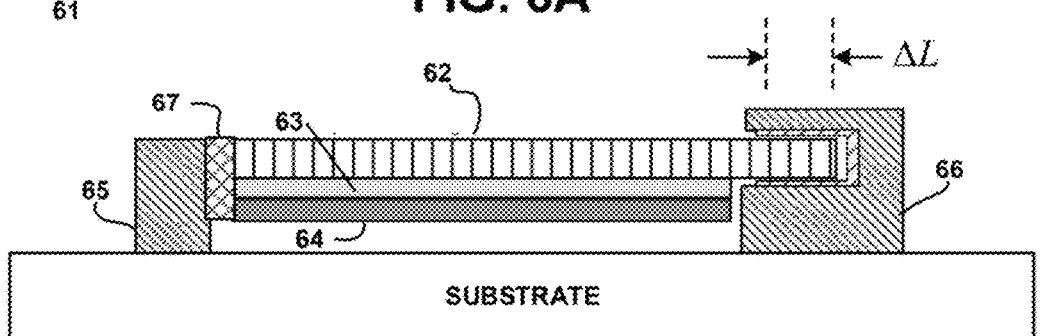
Figure 6C:
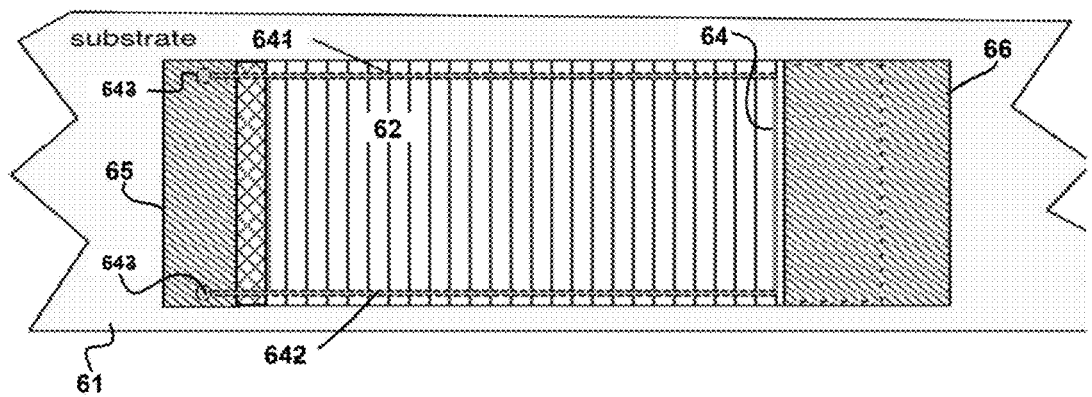

FIGS. 6A, 6B and 6C schematically illustrate a photon detector device 60 according to another embodiment of the invention, which is based on a CTE and variable resistor framework. Referring initially to FIG. 6A, a schematic side view of the photon detector device 60 is shown, wherein the photon detector 60 comprises a substrate 61, a plate-shaped detector member 62, an insulating layer 63 formed on a bottom surface of the plate-shaped detector member 62, a resistor layer 64 formed on the insulating layer 63, a first support member 65 and a second support member 66. One end of the multi-layer structure 62/63/64 is fixedly connected to the first support member 65 using an electrically and thermally insulating material 67 (e.g., silicon oxide). Another end of the multilayer structure 62/63/64 is slidably supported by the second support member 66, wherein an end portion of the plate-shaped detector member 62 disposed in a slot 68 of the second support member 66. A thin layer of insulating material 69 lines the inner surfaces of the slot 68.

In one embodiment of the invention, the plate-shaped detector member 62 is formed of a material (or multiple materials) which can absorb photons (e.g. thermal IR radiation) and which have a suitable thermal coefficient of expansion characteristic. The insulating layer 63 is formed of any suitable material that can electrically and thermally insulate the resistor layer 64 from the unpowered detector member 62. The resistor layer 64 is formed of any electrically conductive material that has an electrical resistance which varies in response to stress forces (e.g., stretching) applied to the resistor layer 64 by the expansion and contraction of the plate-based detector member 62.

FIG. 6B schematically illustrates a state of operation of the photon detector 60 of FIG. 6B, in which the plate-shaped detector member 62 has expanded to an increased length (e.g., length increase of ΔL) from the quiescent state of FIG. 6A, causing the resistor layer 64 to be stretched. This stretching of the resistor layer 64 causes a change in resistance (e.g., decrease in resistance) of the resistor layer 64. Using techniques as discussed above, the resistor layer 64 can be a variable resistor element that is part of an RC oscillator circuit, wherein the change in resistance of the resistor layer 64 can be used to vary a current or voltage of the oscillator circuit or an LED driver circuit, for example.

For example, the resistor layer 64 may be implemented as a resistor in the oscillator circuit 18 of FIG. 1B, for example, wherein the oscillator 18 is formed in an active device layer of the substrate 61 with interconnects formed in the substrate 61 and in the first support member 65 to connect the resistor layer 64 to the active oscillatory formed in the substrate 61.

For example, FIG. 6C is a top view of the photon detector shown in FIG. 6B. FIG. 6C shows an embodiment of electrical interconnects 64-1, 64-2 and 64-3 which can be used to connect the resistor layer 64 to oscillator circuitry in the substrate 61. The interconnects include elongated wires 64-1 and 64-2 that are formed along the sides or within the side portions of the resistor layer 64. The elongated wires 64-1 and 64-1 are connected at one end to conductive vias 64-3 that extend through the first supporting member 65 and connected to other wiring in the substrate 61.

In one embodiment of the invention, the plate-shaped detector member 62 can be formed of a polymer material having a suitable thermal coefficient of expansion characteristic such as teflon, ABS, etc. Moreover, when a polymer-based detector member 62 is utilized, the resistor layer 64 can be formed with an electrically conductive polymer material having similar properties of the polymer-based detector member 62. For example, the resistor layer 64 can be formed of a polymer material doped with conductive material such as ITO, Indium, Tin, or other suitable conductive materials. In another embodiment of the invention, the plate-shaped detector member 62 can be formed of a metallic material such as copper, the insulating layer 63 can be formed of graphite, and the resistor layer 64 can be formed of a material such as graphene, or other suitable materials.

In this regard, when fabricating the photon detector structure 60, the various materials that are used to form the different layers 62, 63 and 64, for example, should be selected so that one or more of such layers are not damaged during fabrication stages to form the other layers and components of the photon detector 60. Moreover, the materials that are used to form the different layers should have similar properties with regard to, e.g., elasticity or hardness, so as to prevent delamination of the layers 62, 63 and 64 over time due to continued expansion and contraction and stressing of the different layers.

Figure 7:
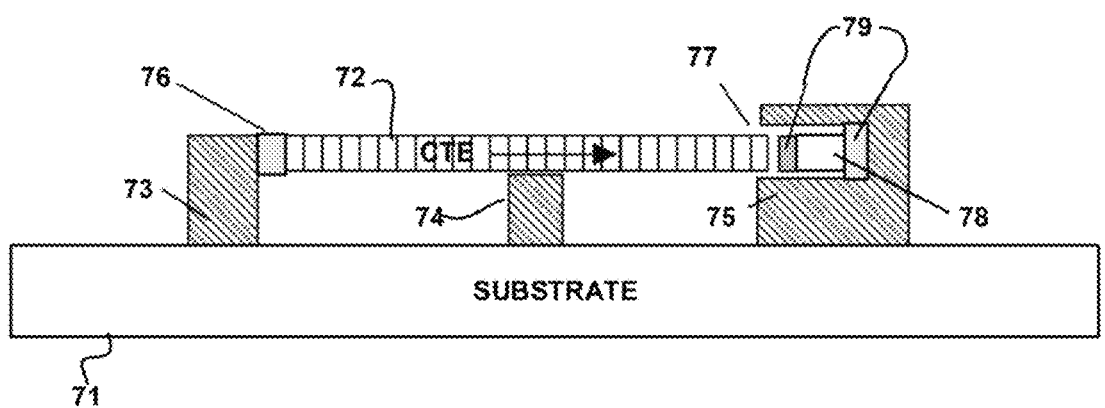
FIG. 7 is a schematic view of a photon detector device according to another embodiment of the invention, which is based on a CTE framework.

FIG. 7 schematically illustrates a photon detector device 70 according to another embodiment of the invention, which is based on a CTE and variable resistor framework. FIG. 7 is a schematic side view of the photon detector device 70, which comprises a substrate 71, a plate-shaped detector member 72, a first support member 73, a second support member 74, and a third support member 75. One end of the plate-shaped detector member 72 is fixedly connected to the first support member 73 using an electrically and thermally insulating material 76. The plate-shaped detector member 72 is slidably supported by the second support member 74. Another end of the plate-shaped detector member 72 is aligned to a slot 77 formed in the third support member 75. A resistor element 78 is disposed within the slot 77. A thermal and electrical insulating material 79 is used to fixedly secure the resistor element 78 to an inner surface of the slot 77, and thermally and electrically insulate the resistor element 78 from the plate-shaped detector member 72.

The plate-shaped detector member 72 comprises a material having a thermal coefficient of expansion that causes the detector member 72 to distort (e.g., expand) due to absorption of incident photons, e.g., absorption of incident thermal IR photonic radiation. The plate-shaped detector member 72 can be formed of a metallic material such as copper, or a polymer material. The resistor element 78 can be formed of silicon, graphene, or a doped polymer.

In operation, when the plate-shape detector member 72 expands due absorption of thermal IR radiation, the expanding detector 72 exerts mechanical stress on the resistor element 78, in particular, squeezing the resistor element 78, which results in changing the resistance of the resistor element 78 (e.g., increasing the resistance). Using techniques as discussed above, the resistor element 78 can be a resistor element that is part of an RC oscillator circuit, wherein the change in resistance of the resistor element 78 can be used to vary a current or voltage of the oscillator circuit or an LED driver circuit, for example.

In another embodiment of the invention, the resistor element 78 can be replaced by a resonator member that is formed of aluminum nitride or a piezoelectric material, which generates an output signal having a frequency or period of oscillation that varies depending on the amount of mechanical stress applied to the resonator member by the expansion and contraction of the plate-shaped detector member 72.

Figure 8A:
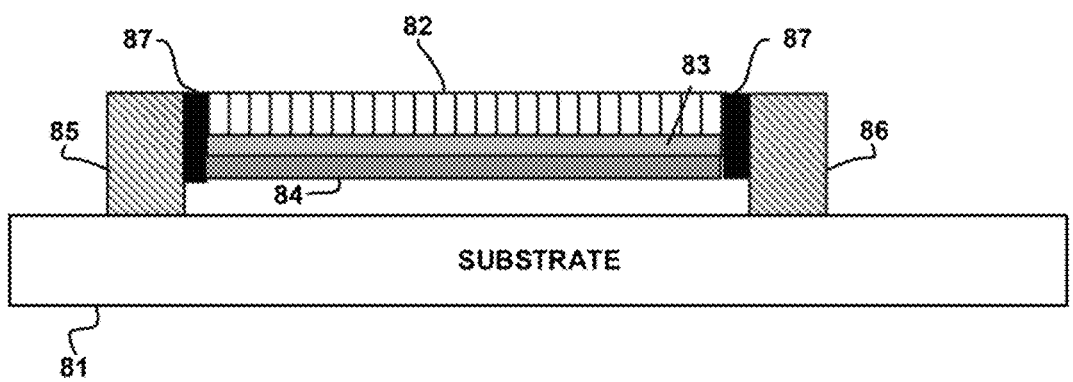
FIGS. 8A and 8B are schematic views of a photon detector device according to another embodiment of the invention, which is based on a CTE framework.
Figure 8B:
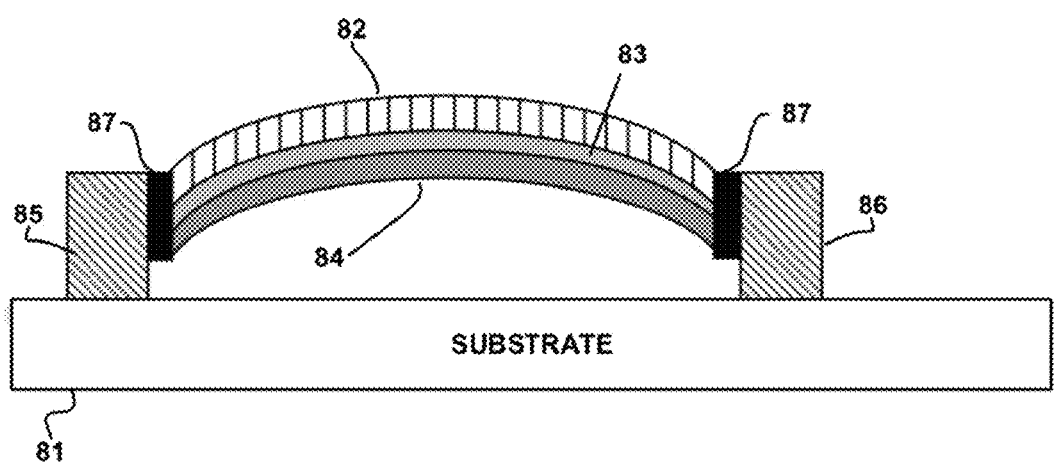

FIGS. 8A and 8B schematically illustrate a photon detector device 80 according to another embodiment of the invention, which is based on a CTE and variable resistor framework. Referring initially to FIG. 8A, a schematic side view of the photon detector device 80 is shown, wherein the photon detector 80 comprises a substrate 81, a plate-shaped detector member 82, an insulating layer 83 formed on a bottom surface of the plate-shaped detector member 82, a resistor layer 84 formed on the insulating layer 83, a first support member 85, and a second support member 86. Both ends of the multi-layer structure 82/83/84 are fixedly secured to the first and second support members 85 and 86 using an electrically and thermally insulating material 87. The photon detector 80 can be formed of the same or similar materials as the embodiment of the photon detector 60 discussed above with reference to FIG. 6A, for example.

FIG. 8B schematically illustrates a state of operation of the photon detector 80 of FIG. 8A, in which the multi-layer structure 82/83/84 becomes distorted (e.g. bowed up) as the plate-shaped detector member 82 absorbs photonic radiation and expands to an increased length from the quiescent state of FIG. 8A. The bowing results from the fact that both ends of the multi-layer structure 82/83/84 are fixedly secured to the first and second support members 85 and 86. The expansion and resulting bowing of the plate-shaped detector member 82 causes the other layers 83 and 84 to bow and distort, thereby causing a change in resistance (e.g., decrease in resistance) of the resistor layer 84. Using techniques as discussed above, the resistor layer 84 can be a variable resistor element that is part of an RC oscillator circuit, wherein the change in resistance of the resistor layer 84 can vary a current or voltage of the oscillator circuit or an LED driver circuit, for example.

Figure 9:
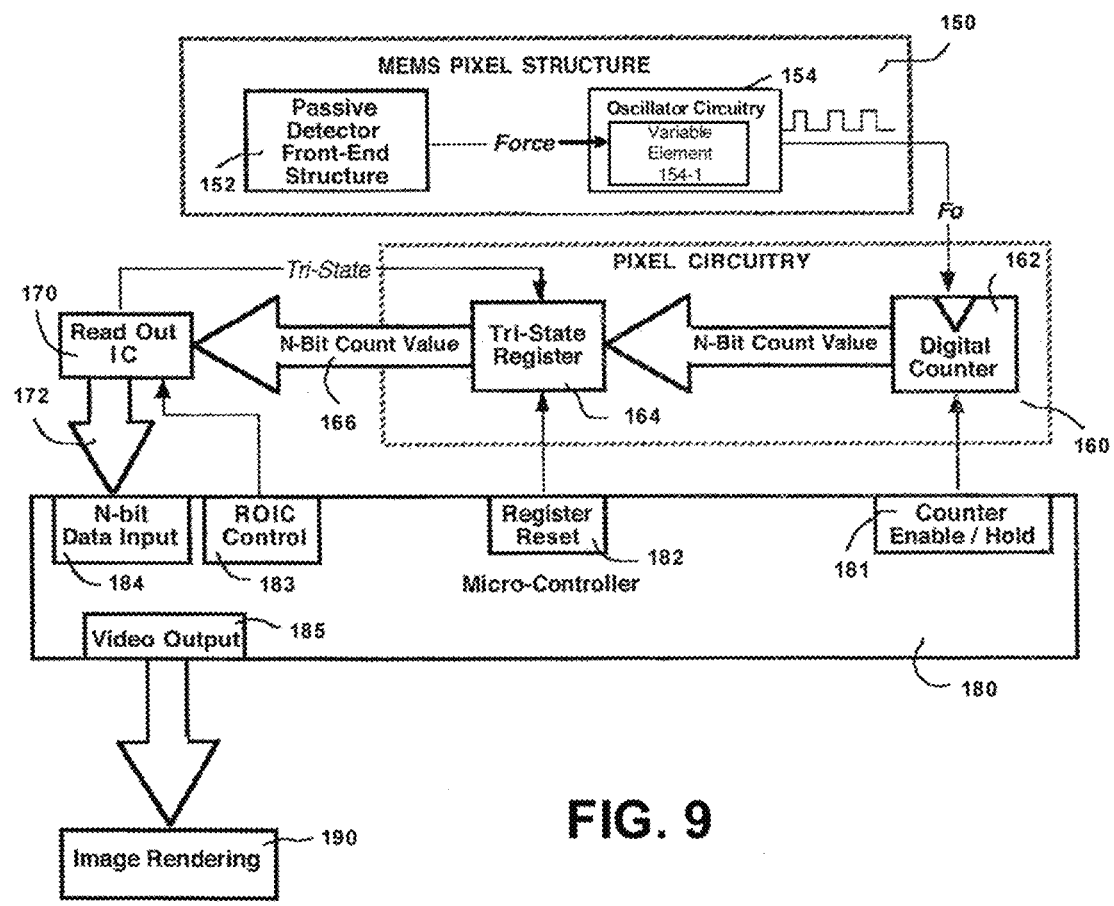
FIG. 9 is a block diagram of an imager system based on passive detectors, according to an exemplary embodiment of the invention.

FIG. 9 is a block diagram of an imager system implementing passive detectors, according to an exemplary embodiment of the invention. In general, FIG. 9 shows an imager circuit comprising a pixel structure 150, pixel circuitry 160, a read out integrated circuit 170 ("ROIC"), a controller 180, and an image rendering system 190. The pixel 150 comprises a passive detector front-end structure 152 and an oscillator circuit 154 with a variable element 154-1. The pixel circuitry 160 comprises a digital counter 162 and a tri-state register 164. The controller 180 comprises a counter enable/hold control block 181, a register reset block 182, an ROIC control block 183, a data input control block 184, and a video output control block 185.

In the pixel structure 150 of FIG. 9, the passive detector front-end structure 152 generically represents any one of the passive pixel detector structures discussed herein, including the support structures and detector elements that are designed to be mechanically distorted in response to photon exposure, for example, and apply mechanical stress (force) to the variable element 154-1 (e.g., variable resistor or variable capacitor, etc.). The detector front-end structure 154 is electrically passive and has no noise generating electronics.

The oscillator circuit 154 generates an output signal Fo having a frequency or period of oscillation (e.g., a square wave signal). The oscillator circuit 154 is designed to generate a reference (or base) frequency (no photon exposure) in a state in which no additional stress, other than the pre-stress amount, is applied to the variable element 154-1 by the detector front-end 152 due to photon exposure. As mechanical stress is applied to the variable element 154-1 by the detector front-end 152 due to photon exposure, the oscillating frequency of the oscillator circuit 154 will change (increase or decrease) from its reference frequency. In one exemplary embodiment, the digital circuits 160, 170 and 180 collectively operate to determine the output signal frequency $F_o$ at a given time, and determine an amount of incident photonic energy absorbed by the passive detector element 152 based on the determined output signal frequency $F_o$ of the oscillator circuit 154 at the given time, and generate image data based on the determined amount of incident photonic energy at the given time, which is then rendered by the imaging system 190.

In particular, in one embodiment, the output signal generated by the oscillator circuit 154 is a digital square wave signal having a frequency $F_o$ that varies depending on the stress applied to the variable element 154-1 of the oscillator circuit 154 by the passive detector front-end structure 152. The output signal generated by the oscillator circuit 154 is input to a clock input port of the digital counter 162. For each read cycle (or frame) of the imager, the digital counter 162 counts the pulses of the output signal from the oscillator circuit 154 for a given "counting period" (or reference period) of the read cycle. The counting operation of the digital counter 162 is controlled by a CLK enable signal generated by the counter control block 181 of the controller 180. For each read cycle, the count information generated by the counter 162 is output as an n-bit count value to the tri-state register 164.

The ROIC 170 reads out the count value (pixel data) from the pixel circuitry 160 of a given pixel 150 for each read cycle. It is to be understood that for ease of illustration, FIG. 9 shows one pixel unit 150 and one corresponding pixel circuit 160, but an imager can have a plurality of pixel units 150 and corresponding pixel circuits 160 forming a linear pixel array or a 2D focal plane pixel array, for example. In this regard, the ROIC 170 is connected to each pixel circuit 160 over a shared n-bit data bus 166, for controllably transferring the individual pixel data from each pixel counting circuit 160 (which is preferably formed in the active silicon substrate surface under each corresponding pixel structure 150) to the controller 180.

In particular, in response to control signals received from the ROIC control block 183 of the controller 180, the ROIC 170 will output a tri-state control signal to the pixel circuitry 160 of a given pixel 150 to read out the stored count data in the shift-register 164 onto the shared data bus 166. The shift-register 164 of each pixel circuit 160 is individually controlled by the ROIC 170 to obtain the count data for each pixel at a time over the data bus 166. The count data is transferred from the ROIC 170 to the controller 180 over a dedicated data bus 172 connected to the n-bit data input control block 184 of the controller 180. After each read cycle, the tri-state register 164 of each pixel will be reset via a control signal output from the register reset control block 182 of the controller 180.

The controller 180 processes the count data obtained from each pixel in each read cycle (or video frame) to determine the amount of incident photon exposure for each pixel and uses the determined exposure data to create a video image. The video data is output to an image rendering system 190 via the video output block 185 to display an image. In some embodiments of the invention where the counter 162 for a given pixel 150 obtains count data for the given pixel 150 by directly counting the output signal frequency generated by the oscillator circuit 154, the controller 180 will use the count data to determine a grayscale level for the pixel, which corresponds to the amount of the incident photonic exposure of the pixel. For example, in some embodiments, the grayscale level can be determined using a grayscale algorithm or using a lookup table in which the different grayscale values (over a range from black to white) are correlated with a range of count values for a priori determined increments of changes in the oscillating frequency of the oscillator circuit 154 from the base reference frequency to a maximum oscillating frequency. The maximum oscillating frequency is the highest frequency that can output from the oscillator circuit 154 in response to the maximum amount of stress force that can be applied by the given passive detector front-end structure 152 to the variable element 154-1.

Figure 10:
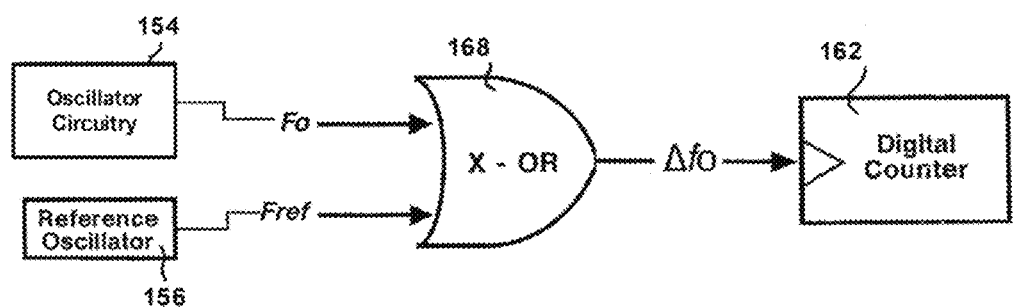
FIG. 10 is a block diagram that illustrates another exemplary embodiment of a pixel unit and pixel circuitry, which can be implemented in the imager system of FIG. 9.

In other embodiments of the invention, the pixel structure and pixel circuitry of FIG. 9 can be modified such that the counter will count the frequency of a signal that represents the difference between the base reference frequency of the oscillator circuit 154 and the actual output frequency generated by the oscillator circuit 154 at a given time in response to stress applied by the passive detector front-end 152 to the variable element 154-1 of the oscillator circuit 154. For example, FIG. 10 illustrates another exemplary embodiment of a pixel unit and pixel circuitry that can be implemented in the imager system of FIG. 9. In FIG. 10, the pixel 150 (of FIG. 9) is modified to include a reference oscillator 156 that outputs a reference resonant frequency $F_{ref}$. The pixel circuitry 160 (of FIG. 9) is modified to include an exclusive-Or gate 168 that receives as input, the output signal of the oscillator circuit 154 (having a variable frequency Fo) and the fixed signal from the reference oscillator 156. The X-Or gate 168 operates to remove the base frequency component of the signal Fo output from the oscillator circuit 154 based on the reference frequency of the reference oscillator 156 and outputs a square wave signal having a frequency equal to the change $\Delta F_o$ in frequency of the oscillator circuit 154. The $\Delta F_o$ frequency signal, which is much lower in frequency than the oscillating frequency Fo of the oscillator circuit 154, requires a lower bit number counter 162 to count the $\Delta F_o$ signal, making it simpler to implement. As with the embodiment of FIG. 9, the $\Delta F_o$ signal is counted for a reference period and the count value is used to determine incident photon exposure of the pixel, as discussed above.

Although exemplary embodiments have been described herein with reference to the accompanying drawings for purposes of illustration, it is to be understood that the present invention is not limited to those precise embodiments, and that various other changes and modifications may be affected herein by one skilled in the art without departing from the scope of the invention.

What is claimed is:

1. An imaging device, comprising:
   a substrate comprising an oscillator circuit and digital circuitry;
   a photon detector formed on the substrate, wherein the photon detector comprises:
      a circuit element that is connected to, and forms part of, the oscillator circuit, wherein the circuit element comprises an electrical property that determines a frequency or period of oscillation of an output signal generated by the oscillator circuit;
      an unpowered detector member, wherein the unpowered detector member is configured for photon exposure, wherein the unpowered detector member comprises a material having a thermal coefficient of expansion that causes the unpowered detector member to distort due to said photon exposure, wherein the unpowered detector member is further configured to apply a mechanical force to the circuit element due to said distortion of the unpowered detector member, wherein the mechanical force causes a change in the electrical property of the circuit element, which changes the frequency or period of oscillation of the output signal generated by the oscillator circuit; and
      a thermal insulating member configured to thermally insulate the circuit element from the unpowered detector member; and
   wherein the digital circuitry is configured to (i) determine the frequency or period of oscillation of the output signal generated by the oscillator circuit as a result of the mechanical force applied to the circuit element by the unpowered detector member, and to (ii) determine an amount of said photon exposure based on the determined frequency or period of oscillation of the output signal generated by the oscillator circuit.

2. The device of claim 1, wherein the photon detector is configured to detect thermal infrared energy having a wavelength in a range of about 2 micrometers to 25 micrometers.

3. A thermal imaging system comprising the device of claim 1.

4. The device of claim 1, wherein the electrical property comprises electrical resistance, and wherein the circuit element comprises a resistor structure.

5. The device of claim 4, wherein the resistor structure comprises a silicon resistor, and wherein the mechanical force applied to the resistor structure causes a change in the resistance of the silicon resistor.

6. The device of claim 4, wherein the resistor structure comprises graphene, and wherein the mechanical force applied to the resistor structure causes a change in the resistance of the graphene.

7. The device of claim 1, wherein the electrical property comprises capacitance, and wherein the circuit element comprises a capacitor structure.

8. The device of claim 7, wherein the capacitor structure comprises a dielectric material formed of tantalum, wherein the mechanical force applied to the dielectric material causes a change in capacitance of the capacitor structure.

9. The device of claim 1, wherein the unpowered detector member is formed of a polymer material, and wherein the circuit element comprises a resistive element that is formed of a polymer material doped with a conductive material.

10. A method, comprising:
exposing a photon detector to incident photons, wherein the photon detector comprises an unpowered detector member, a circuit element that is connected to, and forms part of, an oscillator circuit, and a thermal insulating member configured to thermally insulate the circuit element from the unpowered detector member, wherein the circuit element comprises an electrical property that determines a frequency or period of oscillation of an output signal generated by the oscillator circuit;
distorting the unpowered detector member due to said photon exposure, wherein the unpowered detector member comprises a material having a thermal coefficient of expansion that causes the unpowered detector member to distort due to said photon exposure;
applying a mechanical force to the circuit element due to the distorting of the unpowered detector member, wherein the mechanical force causes a change in the electrical property of the circuit element, which changes the frequency or period of oscillation of the output signal generated by the oscillator circuit;
determining a frequency or period of oscillation of the output signal generated by the oscillator circuit as a result of the mechanical force applied to the circuit element by the unpowered detector member; and
determining an amount of said photon exposure of said photon detector based on said determined frequency or period of oscillation of the output signal generated by the oscillator circuit.

11. The method of claim 10, further comprising generating image data using the determined frequency.

12. The method of claim 10, wherein determining an amount of said photon exposure comprises:
generating count data by counting a number of digital pulses in the output signal generated by the oscillator circuit for a given counting period; and
determining a level of photon exposure based on said count data.

13. The method of claim 1, wherein the electrical property comprises electrical resistance, and wherein the circuit element comprises a resistor structure.

14. The method of claim 13, wherein the resistor structure comprises a silicon resistor, and wherein the mechanical force applied to the resistor structure causes a change in the resistance of the silicon resistor.

15. The method of claim 13, wherein the resistor structure comprises graphene, and wherein the mechanical force applied to the resistor structure causes a change in the resistance of the graphene.

16. The method of claim 10, wherein the electrical property comprises capacitance, and wherein the circuit element comprises a capacitor structure.

17. The method of claim 16, wherein the capacitor structure comprises a dielectric material formed of tantalum, wherein the mechanical force applied to the dielectric material causes a change in capacitance of the capacitor structure.

18. The method of claim 10, wherein the unpowered detector member is formed of a polymer material, and wherein the circuit element comprises a resistive element that is formed of a polymer material doped with a conductive material.

* * * * *